(12) United States Patent  
Gunzelmann et al.

(10) Patent No.: US 7,424,049 B2
(45) Date of Patent: Sep. 9, 2008

(54) ACQUISITION METHOD AND APPARATUS FOR CARRYING OUT THE METHOD

(75) Inventors: Bertram Gunzelmann, Augsburg (DE); Arkadi Molev-Shteiman, Bnei Brak (IL)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/557,373

(22) Filed: Nov. 7, 2006

(65) Prior Publication Data

US 2007/0064777 A1    Mar. 22, 2007

Related U.S. Application Data

(63) Continuation of application No. 09/767,379, filed on Jan. 22, 2001, now Pat. No. 7,133,438, which is a continuation of application No. PCT/DE99/01962, filed on Jul. 1, 1999.

(30) Foreign Application Priority Data

Jul. 21, 1998    (DE) ............................... 198 32 850

(51) Int. Cl.
*H04B 1/00*    (2006.01)
(52) U.S. Cl. ..................................... 375/150
(58) Field of Classification Search ................ 375/130, 375/136, 147, 150, 151, 343, 316, 152
See application file for complete search history.

(56) References Cited

U.S. PATENT DOCUMENTS 5,237,587 A * 8/1993 Schoolcraft ................. 375/150
5,359,627 A * 10/1994 Resnikoff .................... 375/254
5,590,160 A * 12/1996 Ostman ....................... 375/367

OTHER PUBLICATIONS

"Partial File History of Related U.S. App. No. 09/767,379 .pdf", (Downloaded from Private Pair Oct. 22, 2007), 124 pgs.

* cited by examiner

*Primary Examiner*—Sam K Ahn
(74) *Attorney, Agent, or Firm*—Schwegman, Lundberg & Woessner, P.A.

(57) ABSTRACT

An acquisition method for identifying a transmitter, and a correlator for carrying out the method includes correlating a received binary-coded spread sequence having m bits at a frequency f with a locally generated spread sequence by phase-shifting a multiplicity of locally generated spread sequences with respect to the received spread sequence, where f is the frequency of the incoming spread sequence. The received spread sequence is correlated with a locally generated spread sequence at the frequency f. The received spread sequence is stored and the stored, received spread sequence is processed at an oversampling rate i*f. The received, stored spread sequence is split into i sections and the correlation is carried out in i steps.

11 Claims, 3 Drawing Sheets

ACQUISITION METHOD AND APPARATUS FOR CARRYING OUT THE METHOD

CROSS-REFERENCE TO RELATED APPLICATION

This application is a Continuation of U.S. application Ser. No. 09/767,379, filed on Jan. 22, 2001, now U.S. Pat. No. 7,133,438, which is a Continuation of copending International Application No. PCT/DE99/01962, filed Jul. 1, 1999, which designated the United States.

BACKGROUND OF THE INVENTION

Field of the Invention

The invention lies in the field of communications. The invention relates to an acquisition method in which a coded spread sequence that arrives at a frequency f and has m bits is correlated with a locally generated spread sequence by phase-shifting a multiplicity of locally generated spread sequences with respect to received spread sequences. The invention also relates to an apparatus for carrying out the method.

U.S. Pat. No. 5,768,306 to Sawahashi et al. relates to a sliding correlation apparatus having a memory circuit for storing a received signal, and a time control generation device for generating a clock signal. The clock signal is used to read out the received signal stored in the memory circuit at a frequency that is much higher than a storage rate for the received signal. The sliding correlation apparatus also has a spreading code sequence copy generation device for generating a copy of a spreading code sequence, a multiplication device for multiplying the received signal read out and the copy of the spreading code sequence, an accumulator device for storing an output signal from the multiplication device over a predetermined time interval, and a threshold value detection device for detecting whether or not an output signal from the accumulator device exceeds a predetermined threshold value. In addition, there is a clock generation device for controlling the spreading code sequence copy generation device for generating the spreading code sequence at the same rate as that of the clock signal, the clock generation device being matched so as to change a phase of the copy of the spreading code sequence if a detection output signal from the threshold value detection device is smaller than the threshold value.

One fundamental spread method is the direct sequence method, in which, before transmission, a message is modulated with a higher-frequency pseudo-random binary sequence. If the receiver knows the binary sequence, the receiver can extract the message from the pseudo-random noise signal produced.

Such methods are used in data communication, position finding, and navigation, for example. A problem arising in this context is that a receiver receives signals from a number of transmitters, and the time relationship of the signals must then be determined to identify the signals.

One important field of application for such a method is, in particular, real-time satellite navigation using the NAVSTAR GPS system (Navigation System With Timing And Ranging, Global Positioning System). For the NAVSTAR GPS system, a large number of satellites are used as a transmitter network, and are controlled from ground stations or monitoring stations. At least four satellites must be in a receiver's field of view in order to find the position of the receiver in three dimensions. The messages from the transmitters are decrypted in the receiver to allow the necessary calculations to be carried out based upon them. For a receiver to be able to identify a satellite and to be able to evaluate its information, the receiver must know a transmitter-specific code (gold code), which is transmitted as a periodic signal sequence of predetermined length. In order to find the code, all the codes of the satellites are stored in the receiver. The code of a random satellite is then normally produced first of all, and is compared with the received code. If the code received is not the expected satellite—as is normally the case—comparisons with the stored codes must be carried out until a match is found.

Furthermore, because the phase of each arriving signal is unknown, the signal with the received code must be shifted until a possible match is found. The comparison is carried out through the correlation function of the signal, which becomes virtually unity when synchronization occurs. If one considers all possible variants for such a search process, it is necessary, in principle, to accept long search times.

Methods for shortening the acquisition time are disclosed in Schrödter, GPS-Satelliten-Navigation [GPS Satellite Navigation], Franzis-Verlag, Munich, 1994. For example, receivers are used having a plurality of channels, with the receivers carrying out a parallel search corresponding to the number of channels. However, such a configuration results in a relatively high level of circuit complexity.

SUMMARY OF THE INVENTION

It is accordingly an object of the invention to provide an acquisition method and apparatus for carrying out the method that overcomes the hereinafore-mentioned disadvantages of the heretofore-known methods and devices of this general type and that reduces acquisition time.

With the foregoing and other objects in view, there is provided, in accordance with the invention, a communications acquisition method, including correlating a binary-coded spread sequence arriving at a frequency f and having m bits with a locally generated spread sequence by phase-shifting a multiplicity of locally generated spread sequences with respect to the received spread sequence, correlating the received spread sequence with a locally generated spread sequence at the frequency f, storing the received spread sequence and processing the stored, received spread sequence at an oversampling rate of i*f, where i is an integer, and splitting the stored, received spread sequence into i sections and carrying out the correlation in i steps.

The method achieves reduced acquisition time by correlating the received spread sequence with a locally generated spread sequence at the frequency f. The received spread sequence is stored and the stored, received spread sequence is processed at an oversampling rate i*f. The received, stored spread sequence is split into i sections and the correlation is carried out in i steps.

The apparatus reduces acquisition time by providing a shift register with feedback for holding the received signal sequence in serial form and clocking at an oversampling rate. The register positions in the shift register are connected in parallel to the input of a memory for storage of a plurality of shift register contents read out in succession. The output of the memory is connected in parallel with the shift register. A further memory is provided for holding reference signal sequences, and a comparator is provided for comparing the memory content with the content of the further memory at the oversampling rate.

The invention has the advantage that the transmitter synchronization and the confirmation of a match between a received code and a stored code can be carried out speeded up by the extent of the oversampling rate in comparison with prior art synchronization carried out sequentially. If, for example, an oversampling rate of 32 times is used, then the synchronization process is carried out 32 times faster than when using a conventional method.

In accordance with another mode of the invention, the received spread sequence is shifted bit by bit within k cycles in k section variants each having m bits at an oversampling rate of k*f, where k is an integer, by shifting a most significant bit of a section variant to a position of a least significant bit of a succeeding section variant. After k cycles, the least significant bit is replaced by a succeeding bit of the received spread sequence and repeating the shifting and replacing steps (m−1) times. The locally generated spread sequence is subdivided into k sections each having n bits, where n is an integer, and each of these sections is compared with a section variant of the received spread sequence within a cycle. All matches are counted and the count results are stored. A maximum search is carried out over all the count results.

In accordance with a further mode of the invention, a number of sections of prescribed length is k=32 and a chip length of the sections is n=32.

For simple and rapid processing, it is expedient that the received spread sequence is shifted bit by bit within k cycles in k section variants each having m bits at an oversampling rate of k*f by shifting the most significant bit of a section variant to the position of the least significant bit of the succeeding section variant. After k cycles, the least significant bit is replaced by the succeeding bit of the received spread sequence and the process is repeated (m−1) times. The locally generated spread sequence is subdivided into k sections each having n bits and each of these sections is compared with a section variant of the received spread sequence within a cycle. All matches are counted, and the count results are stored. Finally, a maximum search is carried out over all the count results. As such, the signal sequences can be subdivided into data word lengths that can be processed in a simple manner using conventional data processing components, such as shift registers, memories etc. The configuration furthermore has the advantage that the individual bits in the received signal sequence can be passed through with the aid of a single short-circuited shift register in conjunction with a FIFO memory.

With the objects of the invention in view, there is also provided a correlator for performing a communications acquisition, including a FIFO memory having a memory input and a memory output, the FIFO memory inputting and outputting content, a shift register with feedback for holding a received signal sequence in serial form and being clocked at an oversampling rate, the shift register having register positions connected in parallel to the memory input for parallel storage of a plurality of shift register contents read out in succession, the memory output being connected in parallel with the register positions for parallel transfer of data to the shift register, a further memory for holding reference signal sequences, and a comparator for comparing the content of the FIFO memory with content of the further memory at the oversampling rate, the correlator programmed to perform the steps of correlating a binary-coded spread sequence arriving at a frequency f and having m bits with a locally generated spread sequence by phase-shifting a multiplicity of locally generated spread sequences with respect to the received spread sequence, correlating the received spread sequence with a locally generated spread sequence at the frequency f, storing the received spread sequence and processing the stored, received spread sequence at the oversampling rate equal to i*f, where i is an integer, and splitting the stored, received spread sequence into i sections and carrying out the correlation in i steps.

In accordance with a concomitant feature of the invention, the comparator has a comparator output, and including an adder made of two-bit adders configured to form a cascaded interconnection, each of the two-bit adders having at least two inputs and an output, the output of each of the two-bit adders connected to one of the at least two inputs of a succeeding one of the two-bit adders, the adder connected to the comparator output and configured to add up logic values produced during bit-by-bit comparison for matching bit positions.

Other features that are considered as characteristic for the invention are set forth in the appended claims.

Although the invention is illustrated and described herein as embodied in an acquisition method and apparatus for carrying out the method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
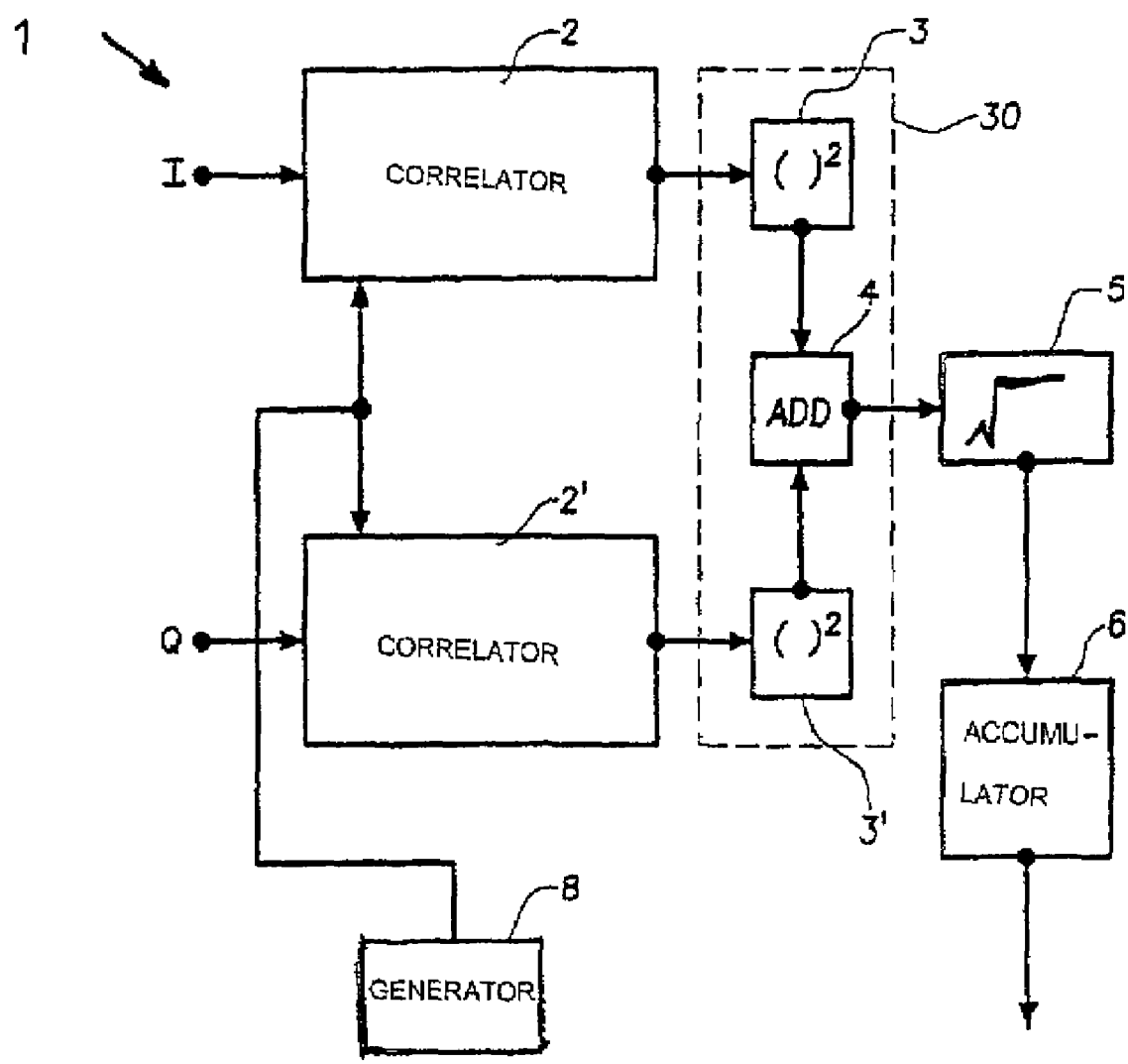
FIG. 1 is a block circuit diagram of a receiver for the GPS navigation system according to the invention.

In all the figures of the drawing, sub-features and integral parts that correspond to one another bear the same reference symbol in each case.

Referring now to the figures of the drawings in detail and first, particularly to FIG. 1 thereof, there is shown a receiver 1 for carrying out a spread method that can be used, for example, in data communication, in mobile radio, and for position finding and navigation. The configuration and function of the receiver 1 are described in the following text for the application in the GPS position-finding and navigation system because such operations are essentially typical of the operations that are used for a spread method in all other receivers. It is in this case found from the received signal that, in addition to the signal from a quite specific transmitter, also contains the information from all the other effective transmitters from the noise level of the entire signal.

The overall signal coming from a non-illustrated antenna as a spread sequence is quadrature-modulated and is mixed to baseband with the aid of a quadrature modulator. A quadrature component Q and an in-phase component I are quantized by a respective non-illustrated analog/digital converter having a word length of 1 bit.

The signals are then supplied in two paths to correlators 2 and 2' of the same type. In each of the correlators 2, 2', the gold code of the associated satellite is found from the noise level of the overall signal. The output signals from the correlators 2, 2' are supplied to a power calculator 30. In the power calculator 30, the squares of the magnitudes in the two paths are calculated in a respective unit 3, 3', and are added up in an adder 4. The unit 5 takes the square root of the added-up signal and, finally, the signal strength is accumulated M times in an accumulator 6 to improve the reliability of the determined result.

A gold-code generator 8 supplies the correlators 2, 2' with the gold codes to be used for the search.

Figure 2:
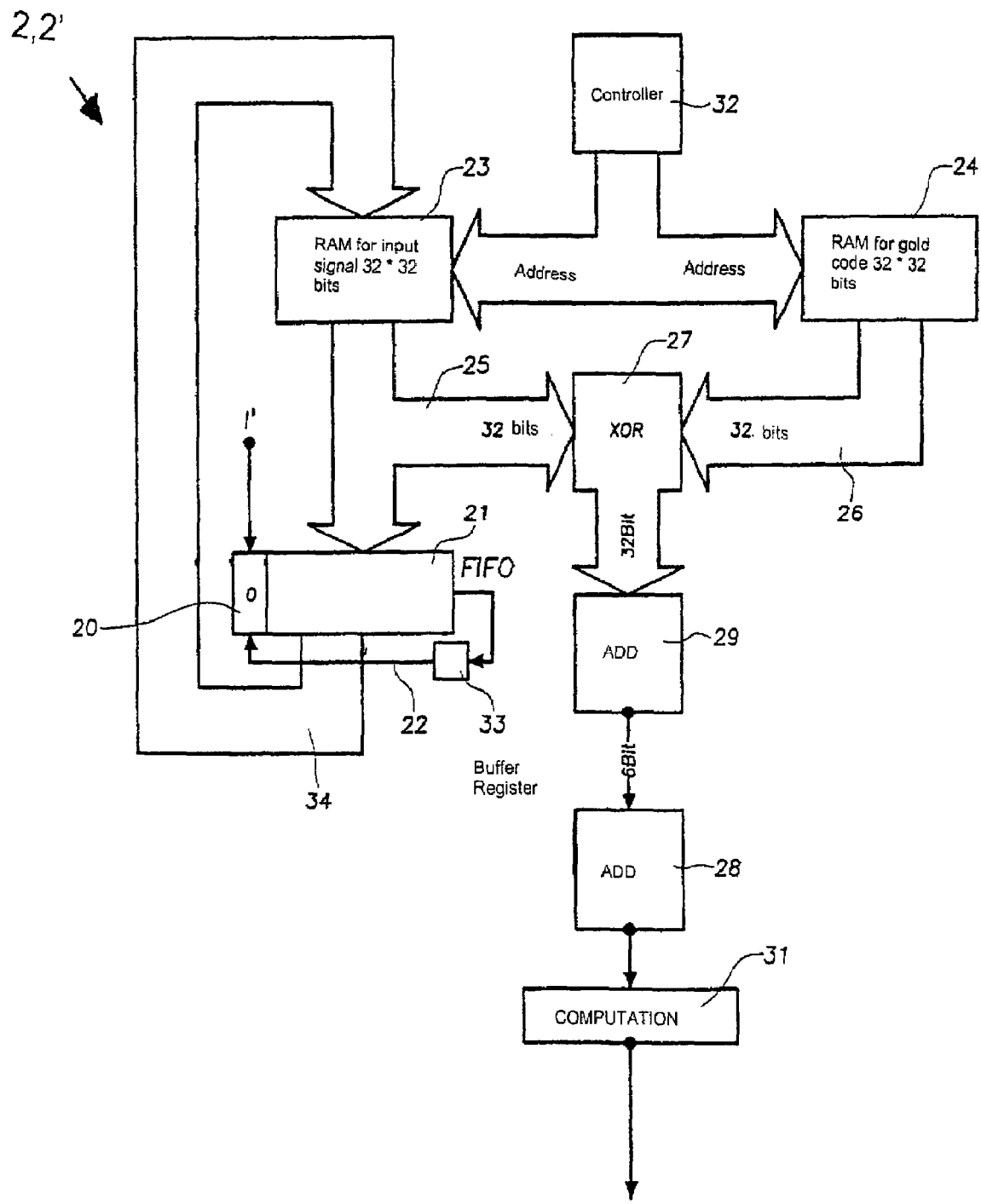
FIG. 2 is a block circuit diagram of a detail of the receiver of FIG. 1.

FIG. 2 illustrates details of the correlator 2 from FIG. 1. Because the two correlators 2, 2' are identical, the description herein is limited to the correlator 2, but likewise applies to correlator 2'.

The respectively produced gold code having a length of m=1023 bits (which is also called a chip) is stored in a data memory 24 and is retained for the search duration. As such, the chip is split into k=32 sections, each having n=32 bits, so that 32 bits (or 31 bits) are stored in each of 32 memory locations. The arriving signal I is clocked bit by bit through a single-bit register 20 in serial form into a FIFO shift register 21 at a first frequency f of, for example, 1 MHz. In the present case, the FIFO shift register 21 has 32 register positions. The FIFO shift register 21 operates at an oversampling rate of i*f, that is to say 32 MHz.

The data memories 23, 24 have address pointers that, through a controller 32, control the reading-in and reading-out processes such that the 32-bit words are stored in chronological sequence. The correlations are started with the latest 32-bit word, and are ended with the oldest 32-bit word.

The respective latest bit (that is to say the bit having been read in most recently) is located in the least significant digit within a 32-bit word, and the oldest bit in the most significant digit.

The FIFO shift register 21 is used to produce 32-bit words successively, which each differ from the preceding 32-bit word in that they are shifted by one bit from the least significant digit to the most significant digit.

Correlation is carried out as follows:

Before a new bit in the received spread sequence or in the received signal I' is read into the least significant register position 20, the current 32-bit word is shifted toward the most significant position, with the most significant bit being read into a buffer register 33, which is used as a delay element. The bit from the received signal I' is now written to the least significant position, and the bit in the buffer store is discarded. The FIFO shift register 21 then contains the newly received bit in the least significant register position, and the 31 least significant bits of the previous 32-bit word in the other register positions. At the same time, an adder or accumulator 28 is reset to the value zero. The new 32-bit word is stored at that address in the data memory 23 (which is a RAM) from which the previous 32-bit word was read.

The memory contents are then respectively read successively for all the remaining memory locations in the data memory 23, and are compared with the corresponding memory contents of the data memory (which is a RAM memory) in an XOR comparator 27, which supplies a 32-bit long result. The sum of all the logic-1 values in this 32-bit word is then determined in a downstream adder 29.

At the same time, the current 32-bit word is written from the data memory 23 to the FIFO 21 and is shifted by one bit from the least significant position toward the most significant position. The bit that was previously buffer stored in the register 33 is now read to the least significant position 20 in the FIFO shift register 21. The new word produced is stored at its old address in the data memory 23. A comparison is then once again carried out with the corresponding section of the gold code stored in the data memory 24, as has already been described above.

Once all 32 words stored in the data memory 23 have been processed in 32 cycles, the accumulator 28 calculates the correlation result.

The contents of the FIFO shift register 21 are stored in parallel at 32 MHz, through a bus 34, at a first address in a data memory (RAM 23). Subsequently, the address pointer of the RAM 23 is incremented by one position, and the FIFO shift register 21 is once again loaded with a 32-bit long data word. The correlation process begins once again from the start.

The gold code produced by the gold-code generator 8 (FIG. 1) is stored in the further data memory RAM 24 that, in an identical manner to the RAM 23, has 32 memory locations, each having 32 bits. In the same way in which the sections with a predetermined chip length of n=32 of the received chip sequences are stored in the RAM 23, the gold code is also in each case subdivided in the further RAM 24 into sections with a predetermined length of n=32, and is stored at 32 successively following addresses. The outputs of the two RAMs 23, 24 are supplied to the XOR comparator 27 through parallel buses 25 and 26, respectively, each having a length of 32 bits, and are then checked, bit by bit, for a match. The bits that indicate a match are added up in a bit adder 29, and are added up over 32 cycles in the accumulator 28.

Figure 3:
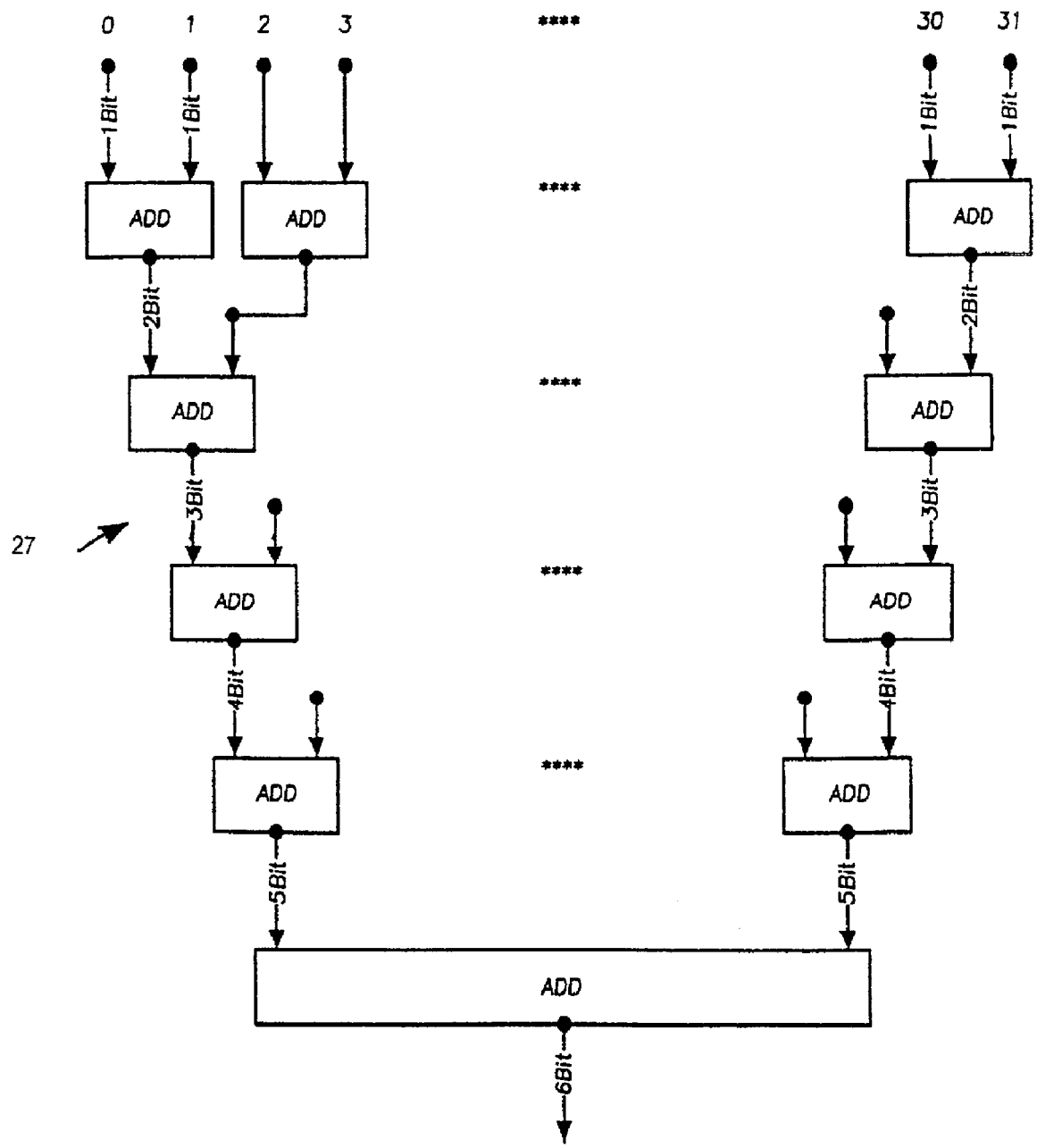
FIG. 3 is a block circuit diagram of an adder of the detail of FIG. 2.

FIG. 3 illustrates an example, which works particularly quickly, for the bit adder 29 shown in FIG. 2. The bit adder 29 includes 2-bit adders ADD interconnected as a cascade, with the respective outputs of two adders ADD connected to the inputs of a succeeding adder ADD in a further stage. Thus, sixteen adders ADD are required in the following example to add up 32 bits in the first stage. Likewise, the second stage has sixteen adders ADD, etc.

One possible way of searching for a maximum is, for example, to use the computation unit 31 to carry out a maximum search over all the signals in the accumulator 6.

The invention claimed is:

1. A communications acquisition method, which comprises:

correlating a received binary-coded spread sequence with a frequency f and having m bits with a locally generated spread sequence by phase-shifting a multiplicity of locally generated spread sequences with respect to the received spread sequence;

storing the received spread sequence and processing the stored, received spread sequence at an oversampling rate of i*f, where i is an integer;

splitting the stored, received spread sequence into i sections and carrying out the correlation in i steps;

shifting the received spread sequence bit by bit within k cycles in k section variants each having m bits at an oversampling rate of k*f, where k is an integer, by shifting a most significant bit of a section variant to a position of a least significant bit of a succeeding section variant;

after k cycles, replacing the least significant bit by a succeeding bit of the received spread sequence and repeating the shifting and replacing steps m−1 times;

subdividing the locally generated spread sequence into k sections each having n bits, where n is an integer, and comparing each of these sections with a section variant of the received spread sequence within a cycle;

counting all matches and storing the count results; and carrying out a maximum search over all the count results.

2. The method according to claim 1, wherein a number of sections of prescribed length is k=32 and a chip length of the sections is n=32.

3. The method according to claim 1, which further comprises:
  summing the correlation results obtained per section correlation step over k section correlation steps to obtain a count result;
  repeating the shifting step m−1 times for obtaining m−1 count results; and
  carrying out a maxmum search over all the m count results.

4. The method according to claim 3, wherein a number of sections of prescribed length is k=32 and a chip length of the section is n=32.

5. The method according to claim 1, wherein the oversampling rate is 32 MHz.

6. A correlator for performing a communications acquisition, comprising:
  a data memory having a memory input and a memory output, said FIFO memory inputting and outputting a content;
  a shift register with feedback for holding a received signal sequence in serial form, said shift register being clocked at an oversampling rate and having register positions connected in parallel to said memory input for parallel storage of a plurality of shift register contents read out in succession, said memory output being connected in parallel with said register positions for parallel transfer of data to said shift register;
  a further memory for holding reference signal sequences; and
  a comparator for comparing the content of said data memory with a content of said further memory at said oversampling rate,
  wherein the correlator further comprising means for correlating a received binary-coded spread sequence with a frequency f and having m bits with a locally generated spread sequence by phase-shifting a multiplicity of locally generated spread sequences with respect to the received spread sequence.

7. The correlator according to claim 6, wherein the correlator further comprising means for storing the received spread sequence and process the stored, received spread sequence at said oversampling rate equal to i*f, where i is an integer.

8. The correlator according to claim 6, wherein the correlator further comprising means for splitting the stored, received spread sequence into i sections and carry out the correlation in i steps.

9. The correlator according to claim 6, wherein said comparator has a comparator output, and includes an adder comprising two-bit adders configured to form a cascaded interconnection, each of said two-bit adders having at least two inputs and an output, said output of each of said two-bit adders connected to one of said at least two inputs of a succeeding one of said two-bit adders, and said adder connected to said comparator output and configured to add up logic values produced during bit-by-bit comparison for matching bit positions.

10. A correlator for performing a communications acquisition, comprising:
  a data memory having a memory input and a memory output, said FIFO memory inputting and outputting a content;
  a shift register with feedback for holding a received signal sequence in serial form, said shift register being clocked at an oversampling rate and having register positions connected in parallel to said memory input for parallel storage of a plurality of shift register contents read out in succession, said memory output being connected in parallel with said register positions for parallel transfer of data to said shift register;
  a further memory for holding reference signal sequences; and
  a comparator for comparing the content of said data memory with a content of said further memory at said oversampling rate,
  wherein the correlator further comprising:
  means for correlating a received binary-coded spread sequence with a frequency f and having m bits with a locally generated spread sequence by phase-shifting a multiplicity of locally generated spread sequences with respect to the received spread sequence;
  means for storing the received spread sequence and process the stored, received spread sequence at said oversampling rate equal to i*f, where i is an integer; and
  means for splitting the stored, received spread sequence into i sections and carry out the correlation in i steps.

11. The correlator according to claim 10, wherein said comparator has a comparator output, and includes an adder comprising two-bit adders configured to form a cascaded interconnection, each of said two-bit adders having at least two inputs and an output, said output of each of said two-bit adders connected to one of said at least two inputs of a succeeding one of said two-bit adders, and said adder connected to said comparator output and configured to add up logic values produced during bit-by-bit comparison for matching bit positions.

* * * * *

UNITED STATES PATENT AND TRADEMARK OFFICE
CERTIFICATE OF CORRECTION

PATENT NO. : 7,424,049 B2  Page 1 of 1
APPLICATION NO. : 11/557373
DATED : September 9, 2008
INVENTOR(S) : Gunzelmann et al.

It is certified that error appears in the above-identified patent and that said Letters Patent is hereby corrected as shown below:

In column 7, line 8, in Claim 3, delete "maxmum" and insert -- maximum --, therefor.

In column 7, line 17, in Claim 6, delete "FIFO" and insert -- data --, therefor.

In column 8, line 12, in Claim 10, delete "FIFO" and insert -- data --, therefor.

Signed and Sealed this

Fourteenth Day of April, 2009

JOHN DOLL
*Acting Director of the United States Patent and Trademark Office*